US009184868B2

(12) United States Patent
Lin et al.

(10) Patent No.: US 9,184,868 B2
(45) Date of Patent: Nov. 10, 2015

(54) TRANSMISSION INTERFACE DEVICE CAPABLE OF CALIBRATING TRANSMISSION FREQUENCY AUTOMATICALLY AND METHOD THEREOF

(71) Applicant: SITRONIX TECHNOLOGY CORP., Hsinchu County (TW)

(72) Inventors: Sheng-Hsun Lin, Hsinchu County (TW); Cheng-Chung Yeh, Hsinchu County (TW); Chun-Chi Yeh, Hsinchu County (TW); Chih-Te Hung, Hsinchu County (TW); Wei-Chia Su, Hsinchu County (TW)

(73) Assignee: Q-Silicon Technologies Corp., Taipei (TW)

( * ) Notice: Subject to any disclaimer, the term of this patent is extended or adjusted under 35 U.S.C. 154(b) by 0 days.

(21) Appl. No.: 14/036,305

(22) Filed: Sep. 25, 2013

(65) Prior Publication Data

US 2014/0105321 A1   Apr. 17, 2014

Related U.S. Application Data

(60) Provisional application No. 61/714,804, filed on Oct. 17, 2012.

(51) Int. Cl.
*H04L 27/00* (2006.01)
*H04L 1/00* (2006.01)
*H04L 7/00* (2006.01)

(52) U.S. Cl.
CPC ............ *H04L 1/0002* (2013.01); *H04L 7/0004* (2013.01); *H04L 7/0016* (2013.01); *H04L 7/0091* (2013.01)

(58) Field of Classification Search
USPC ................................... 375/344, 295
See application file for complete search history.

(56) References Cited

U.S. PATENT DOCUMENTS

2010/0122106 A1* 5/2010 Lee et al. .................. 713/503
2012/0005517 A1* 1/2012 Foster et al. ............... 713/500

FOREIGN PATENT DOCUMENTS

JP    H02-63233 A    3/1990
JP    H09-26894 A    1/1997

(Continued)

OTHER PUBLICATIONS

Communication From Japanese Patent Office Regarding a Counterpart Foreign Application Dated (Emperor Year H26) Oct. 7, 2014.

(Continued)

*Primary Examiner* — Dac Ha
*Assistant Examiner* — Janice Tieu
(74) *Attorney, Agent, or Firm* — Rosenberg, Klein & Lee

(57) ABSTRACT

The present invention relates to a transmission interface device capable of calibrating the transmission frequency automatically, which comprises a clock generating unit, a data transmission unit, and a control unit. The clock generating unit is used for generating an operating clock, which determines a transmission frequency. The data transmission unit is used for connecting to a host and transmitting a plurality of data to the host or receiving the plurality of data from the host according to the operating clock. When the host or the data transmission unit detects transmission errors in the plurality of data, the host or the data transmission unit generates an error handling. The control unit generates an adjusting signal according to the error handling and transmits the adjusting signal to the clock generating unit for adjusting the transmission frequency of the operating clock.

11 Claims, 5 Drawing Sheets

(56) References Cited

FOREIGN PATENT DOCUMENTS

| | | |
|---|---|---|
| JP | 2004-64616 A | 2/2004 |
| JP | 2005-208811 A | 8/2005 |

OTHER PUBLICATIONS

Communication From Korean Patent Office Regarding a Counterpart Foreign Application Dated Sep. 26, 2014.

* cited by examiner

TRANSMISSION INTERFACE DEVICE CAPABLE OF CALIBRATING TRANSMISSION FREQUENCY AUTOMATICALLY AND METHOD THEREOF

FIELD OF THE INVENTION

The present invention relates generally to a transmission interface device and the method thereof, and particularly to a transmission interface device capable of calibrating the transmission frequency automatically and the method thereof.

BACKGROUND OF THE INVENTION

Because various current consumer electronic devices, such as communication devices, image extraction devices, storage devices, and Internet devices, have been developing the functions of high resolution, high definition, or high storage capacity, it is required to process huge volume of digital data. In order to enable users to transmit considerable quantities of digital data between hosts and electronic devices, most of the consumer electronic devices include popular transmission frameworks of high-speed serial bus, for example, universe serial bus (USB) or IEEE1394 transmission frameworks.

Take the USB transmission framework for example. In the USB2.0, there is a strict standard on the frequencies of the interface communication protocol between hosts and USB devices in low-speed, full-speed, and high-speed conditions for corresponding to different applications. In the low-speed condition, the data rate specification of the data stream of hosts is 1.5 MHz±1.5% and applicable to keyboards and mice. In the full-speed condition, the data rate specification of the data stream of hosts is 12 MHz±0.25% and applicable to audio and microphones. In the high-speed condition, the data rate specification of the data stream of hosts is 480 MHz±0.05% and applicable to video and imaging.

In addition, because multiple data transmission stages are defined in the USB transmission framework, the allowable ranges of receiving frequency by the hosts for receiving data differ. For example, according to the USB transmission framework, three data transmission stages are defined, including a device identification stage, a device configuration stage, and a data transmission stage. The allowable ranges of the receiving frequency by the hosts in each stage for receiving data are not identical. The allowable error of the receiving frequency in the data transmission stage is the smallest. This is because substantial volumes of data are to be transmitted, the range of the receiving frequency must be accurate for preventing erroneous data transmission. Thereby, the frequency sources for USB devices are mostly quartz oscillators, resonance oscillators, or adding digital phase-lock loops (DPLLs) for generating an accurate frequency signal.

FIG. 1 shows an interface data transmission framework of the USB device according to the prior art, which comprises a host 10 and a USB device 12. The host 10 and the USB device 12 are connected to each other via the USB interface therebetween and perform signal transmission. Nonetheless, the requirement in the accuracy of the transmission signal frequency of USB is strict. Thereby, the USB device according to the prior art adopts a quartz oscillator 121 connected to the control chip of the USB device 12 for generating the clock signal and used as the operating frequency of the USB device 12. Nonetheless, using the external quartz oscillator 121 increases the manufacturing cost. Besides, because the clock frequency of the quartz oscillator 121 is fixed, compared with the signal transmitted by the host 10, there is possibility of producing errors.

For solving the problem described above, manufactures integrate the internal resistors and capacitors of the control chip in the USB device for producing an RC oscillator used as the frequency source of the USB device, enabling the frequency source of the USB device to be included inside the control chip thereof. Nonetheless, due to process variations, there are approximately ±25% errors in the frequency of the RC oscillator, which does not comply with the standard for USB drivers.

Accordingly, the present invention provides a transmission interface device capable of calibrating the transmission frequency automatically and the method thereof. When the frequencies of the transmission interface device and the host are compatible, according to the error handling transmitted by the host or the error handling detected by the device from the received data, the transmission device is reset and its frequency is adjusted until the frequency of the transmission device falls within the frequency range.

SUMMARY

An objective of the present invention is to provide a transmission interface device capable of calibrating the transmission frequency automatically and the method thereof. The compatibility of the frequencies of the transmission interface device and the host is judged according to the error handling transmitted by the host or the error handling in the received data of the device. Then, according to the error handling, the transmission device is reset and its operating frequency is adjusted until the frequency falls within the acceptable frequency range of the host.

Another objective of the present invention is to provide a transmission interface device capable of calibrating the transmission frequency automatically and the method thereof. The communication between the transmission interface device and the host is divided into a plurality of stages. In each of the stages, the volume of the transmitted data is increased gradually for improving the accuracy of calibrating the transmission frequency of the operating clock progressively.

In order to achieve the objectives and effects described above, the present invention discloses a transmission interface device capable of calibrating the transmission frequency automatically, which comprises a clock generating unit, a data transmission unit, and a control unit. The clock generating unit is used for generating an operating clock, which determines a transmission frequency. The data transmission unit is used for connecting to a host and transmitting a plurality of data to the host according to the operating clock. Alternatively, the host transmits the plurality of data to the data transmission unit according to the operating clock. When the host or the data transmission unit detects transmission errors in the plurality of data, the host or the data transmission unit generates an error handling. The control unit generates an adjusting signal according to the error handling and transmits the adjusting signal to the clock generating unit for adjusting the transmission frequency of the operating clock.

The present invention further discloses a method for calibrating transmission frequency automatically, which comprises steps of generating an operating clock, transmitting a plurality of data to a host or receiving the plurality of data from the host according the operating clock, and the operating clock determining a transmission frequency; the host or a data transmission unit generating an error handling when the host or the data transmission unit detects transmission errors in the plurality of data; and generating an adjusting signal according to the error handling and adjusting the transmission frequency of the operating clock according to the adjusting signal.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Beside, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
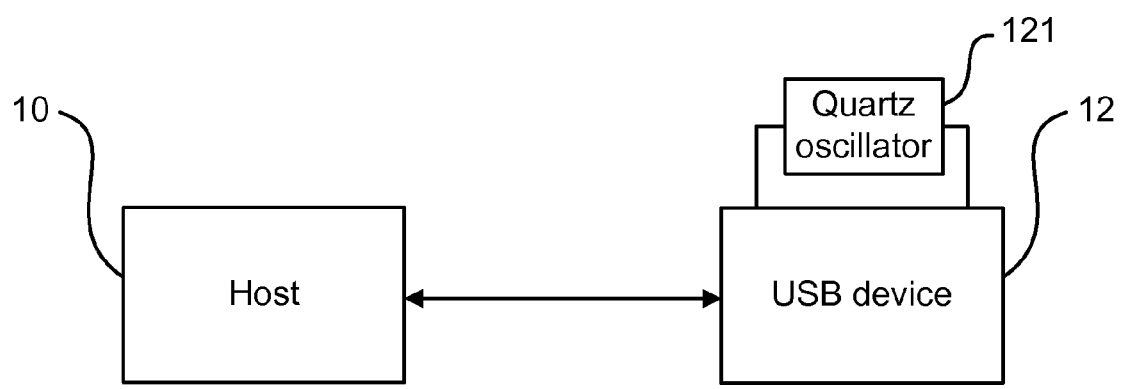
FIG. 1 shows an interface data transmission framework of the USB device according to the prior art.
Figure 2:
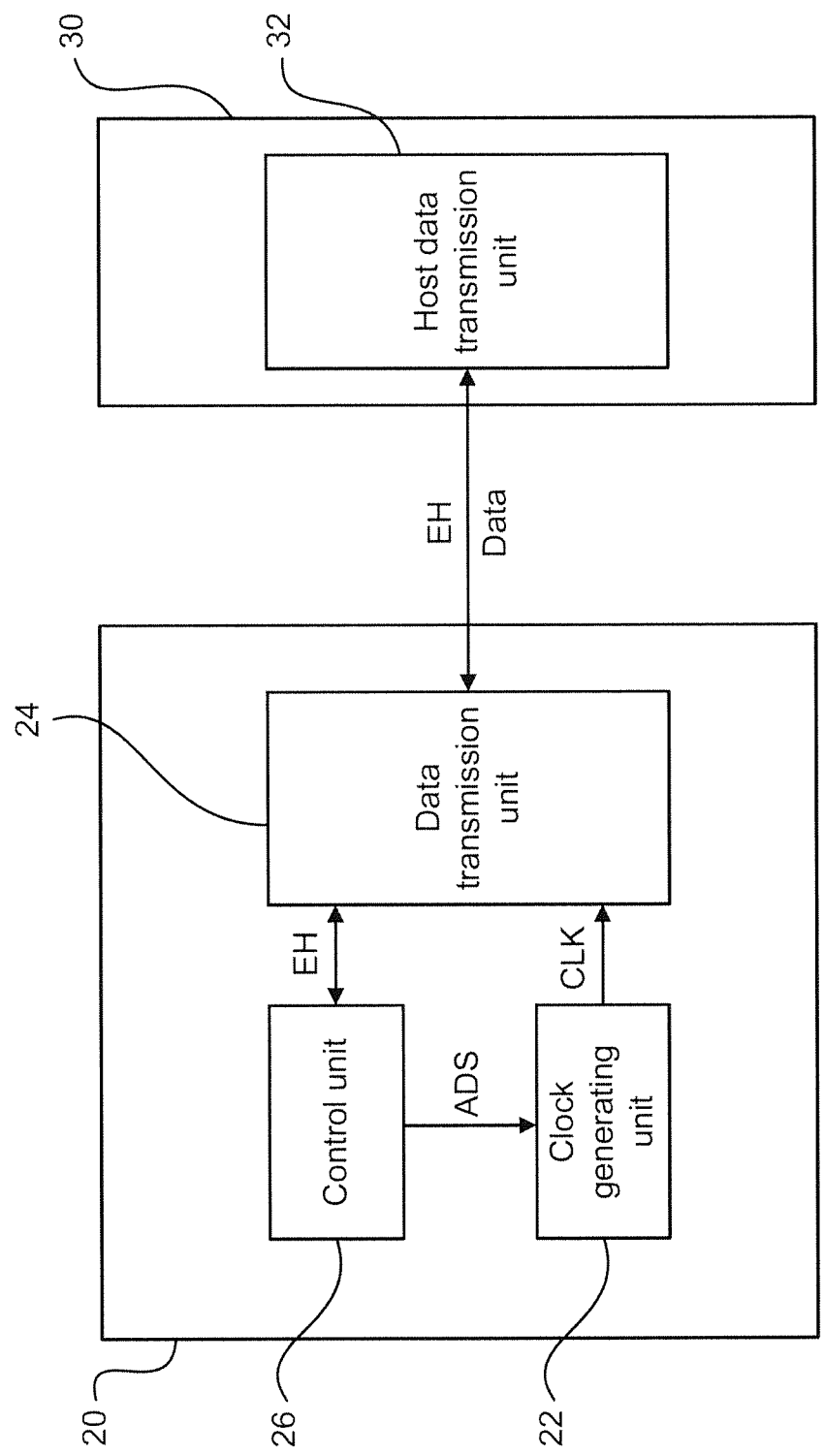
FIG. 2 shows a circuit block diagram of the transmission interface device capable of calibrating the transmission frequency automatically according to the present invention.

FIG. 2 shows a circuit block diagram of the transmission interface device capable of calibrating the transmission frequency automatically according to the present invention. As shown in the figure, the transmission interface device 20 comprises a clock generating unit 22, a data transmission unit 24, and a control unit 26. The clock generating unit 22 is used for generating an operating clock CLK, which determines a transmission frequency. The transmission frequency is just the frequency of the operating clock CLK. The data transmission unit 24 is coupled to the clock generating unit 22 and used for connecting to a host data transmission unit 32 of a host 30. The data transmission unit 24 transmits a plurality of data Data to the host 30 via the host data transmission unit 32 according to the transmission frequency of the operating clock CLK or receives the plurality of data Data from the host 30. When the host 30 or the data transmission unit 24 detects transmission errors in the plurality of data Data, the host 30 or the data transmission unit 24 will generate an error handling EH. When the host 30 detects the transmission errors of the plurality of data Data, the error handling EH is first transmitted to the data transmission unit 24. The control unit 26, coupled to the clock generating unit 22 and the data transmission unit 24, receives the error handling EH via the data transmission unit 24 and transmits an adjusting signal ADS to the clock generating unit 22 according to the error handling EH for adjusting the transmission frequency of the operating clock CLK generated by the clock generating unit 22.

The transmission interface device 20 is, but not limited to, a PCI interface, a SATA interface, a USB interface, a SerDes, or an IEEE1394.

Figure 3:
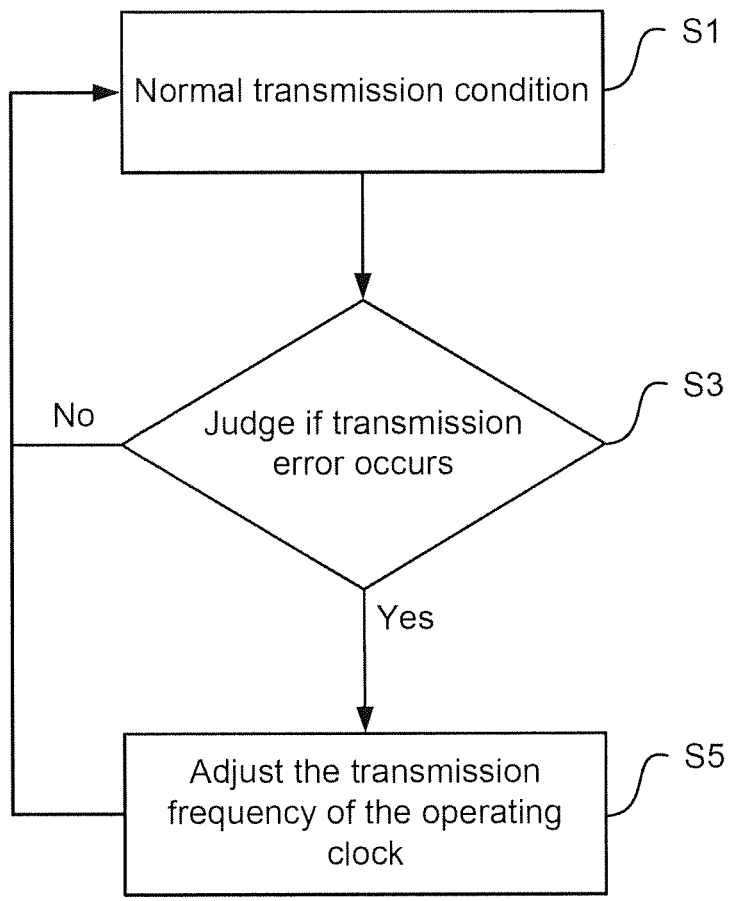
FIG. 3 shows a flowchart of the method for calibrating transmission frequency automatically according to the present invention.

FIG. 3 shows a flowchart of the method for calibrating transmission frequency automatically according to the present invention. First, the step S1 is executed. In normal transmission condition, the clock generating unit 22 generates the operating clock CLK. The data transmission unit 24 transmits the plurality of data Data to the host 30 or receives the plurality of data Data from the host 30 according to the transmission frequency of the operating clock CLK. Next, the step S3 is executed. The host 30 or the data transmission unit 24 detects and judges if transmission errors occur in the plurality of data Data. If not, return to the step S1. If transmission error occur, the host 30 transmits error handling EH to the data transmission unit 24 or the data transmission unit 24 generates error handling EH by itself, and then the step S5 is executed. When the step S1 is executing, the if the case is that the data transmission unit 24 receives the plurality of data Data from the host 30, the data transmission unit 24 can judge if transmission errors occur according to whether the received plurality of data Data are correct. If no transmission error occurs, then return to the step S1. If transmission errors occur, the step S5 is executed. In the step S5, the control unit 26 generates the adjusting signal ADS according to the error handling EH for adjusting the transmission frequency of the operating clock CLK generated by the clock generating unit 22.

In addition, because as the volume of the data received by a general host is larger the acceptable error in the transmission frequency is smaller, the present invention divides the transmission communication between the host 30 and the transmission interface device 20 into three stages, including a device identification stage, a device configuration stage, and a data transmission stage. In the three stages described above, the host 30 requests the volume of the plurality of data Data transmitted between the host 30 and the data transmission unit 24 to increase gradually for improving the accuracy of calibrating the transmission frequency of the operating clock CLK progressively.

The volume of the transmitted data Data between the host 30 and the data transmission unit 24 in the device identification stage, the device configuration stage, and the data transmission stage described above is that the volume in the device identification stage is smaller than that in the device configuration stage and the volume in the device configuration stage is smaller than that in the data transmission stage. When the host 30 is in the device identification stage described above, it has a first transmission frequency range corresponding to the received data volume; when the host 30 is in the device configuration stage, it has a second transmission frequency range; and when the host 30 is in the data transmission stage, it has a third transmission frequency range. The third transmission frequency range is smaller than the second transmission frequency range; the second transmission frequency range is smaller than the first transmission frequency range.

Figure 4:
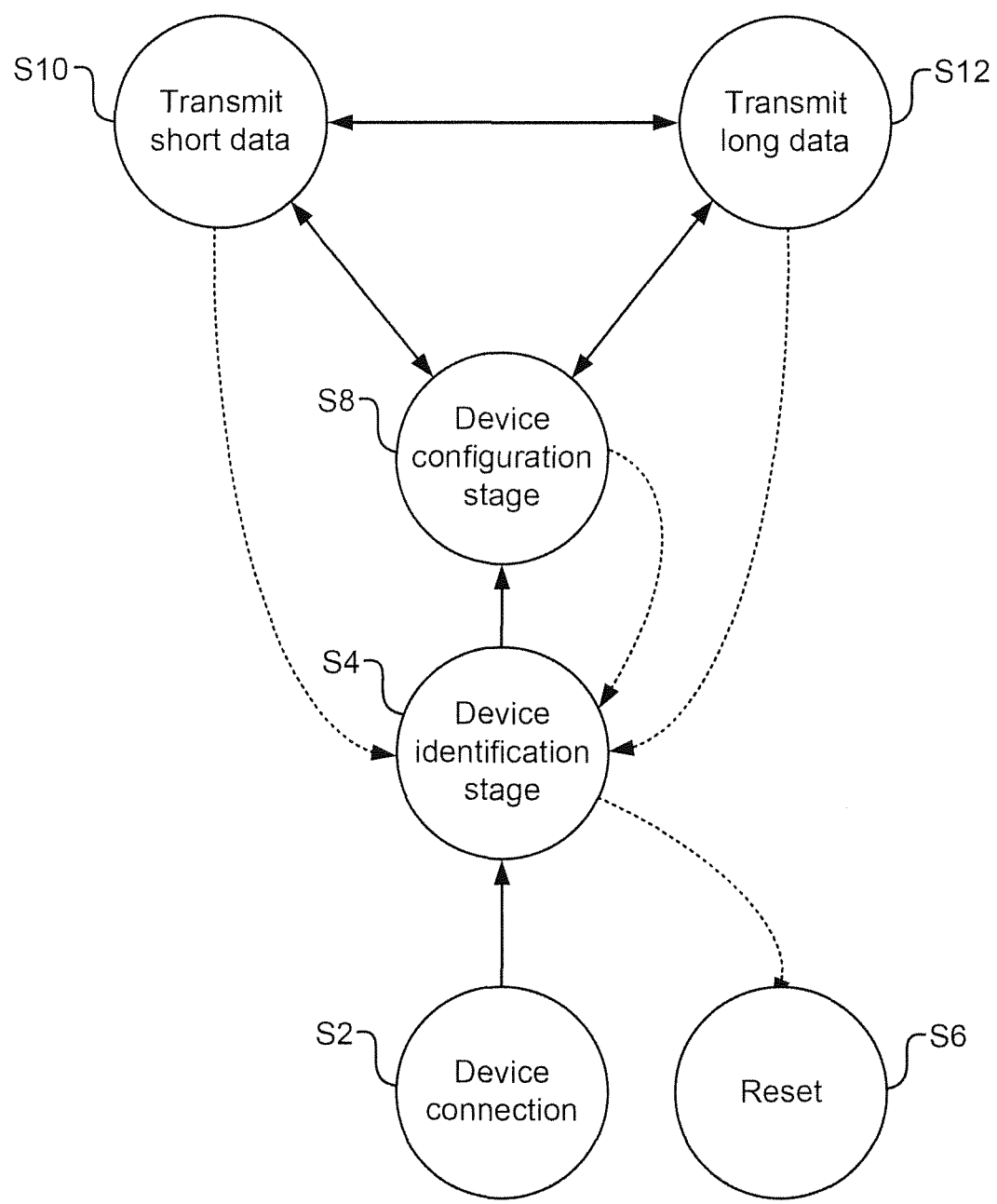
FIG. 4 shows a flowchart of the transmission communication according to the present invention.

For describing the device identification stage, the device configuration stage, and the data transmission stage described above, please refer to FIG. 4, which shows a flowchart of the transmission communication according to the present invention. As shown in the figure, after the transmission interface device 20 is connected to the host 30 (step S2), the device identification stage is started (step S4). In the device identification stage, the data transmission unit 24 transmits only the plurality of data required for identifying device first. The host 30 judges if the plurality of data Data are transmitted erroneously according to the transmission condition of the received plurality of data Data. If a transmission error occurs, it means the transmission frequency at this moment does not fall within the first frequency range of the host 30. Then the host 30 transmits error handling EH to the data transmission unit 24. Alternatively, in the device identification stage, the host 30 transmits the plurality of data Data required for identifying device to the data transmission unit 24 according to the transmission frequency of the operating clock CLK at the moment. The data transmission unit 24 detects if a transmission error occurs according to the received plurality of data Data. If so, the data transmission unit 24 produces error handling EH and submits the error handling EH to the control unit 26.

The control unit 26 receives the error handling EH via the data transmission unit 24 and resets the transmission interface device 20 (step S6) according to the error handling EH. Then the transmission frequency of the operating clock CLK generated by the clock generating unit 22 is adjusted. Afterwards, return to the device identification stage (step S4) and repeat the steps above until the transmission condition of the plurality of data Data is no longer erroneous, namely, when the transmission frequency falls within the first frequency range. Then, the device configuration stage is executed (step S8).

In the device configuration stage (step S8), the data transmission unit 24 will transmit the plurality of data Data according to the transmission frequency of the operating clock CK at the moment. The volume of the plurality of data Data transmitted in this stage is greater than in the previous stage. Thereby, the required accuracy of the transmission frequency is higher. In other words, the second transmission frequency range of the host 30 is smaller. Like the previous stage, the host 30 judges if the plurality of data Data are transmitted erroneously according to the transmission condition of the plurality of data Data or the data transmission unit 24 detects if a transmission error occurs according to the content of the received plurality of data Data. If a transmission error occurs, it means the transmission frequency at this moment does not fall within the second frequency range. Then the host 30 or the data transmission unit 24 generates error handling EH. The control unit 26 resets the transmission interface device 20 according to the error handling EH and returns to the device identification state (step S4). Afterwards, the transmission frequency of the operating clock CLK is adjusted, and the steps S4 to S8 described above are repeated until the transmission frequency falls within the second transmission frequency range. Then, the data transmission stage (steps S10 and S12) is executed.

According to the present invention, the data transmission stage can be divided into, but not limited to, transmitting short data (step S10) and transmitting long data (step S12). Alternatively, in the data transmission stage, it is also possible to transmit either short data or long data only. After the passing the device configuration stage and entering the data transmission stage, the step S10 is first performed. The data transmission unit 24 transmits the plurality of data Data with shorter data length to the host 30 according to the transmission frequency of the operating clock CLK at the moment. Alternatively, the host 30 transmits the plurality of data Data to the data transmission unit 24 according to the transmission frequency of the operating clock CLK at the moment. Like the previous stages, if the case is that the data transmission unit 24 transmits the plurality of data Data, the host 30 judges if transmission errors occur in the plurality of data Data; if the case is that the data transmission unit 24 receives the plurality of data Data, the data transmission unit 24 detects if transmission errors occur in the plurality of data Data. If a transmission error occurs, it means that the transmission frequency at this moment is not in the third transmission frequency range. In the case of the data transmission unit 24 transmitting the plurality of data Data, the host 30 generates error handling EH; in the case of the data transmission unit 24 receiving the plurality of data Data, the data transmission unit 24 generates error handling EH. The control unit 26 resets and transmission interface device 20 according to the error handling EH and returns to the device identification stage (step S4). Afterwards, the transmission frequency of the operating clock CLK is adjusted, and the step S4, and the steps S8 to S10 described above are repeated until the transmission frequency falls within the third transmission frequency range. Then, transmission of long data (step S12) is executed.

While transmitting long data (step S12), like the step S10, the data transmission unit 24 or the host 30 transmits the plurality of data Data with longer data length according to the transmission frequency of the operating clock CLK at this moment. If the data transmission unit 24 or the host 30 judges that the transmission condition of the plurality of data Data is erroneous, it means that the transmission frequency at the moment is not within the third frequency range. Then the data transmission unit 24 or the host 30 generates error handling EH. The control unit 26 resets and transmission interface device 20 according to the error handling EH and returns to the device identification stage (step S4). Afterwards, the transmission frequency of the operating clock CLK is adjusted, and the step S4, the step S8, and the steps S10 to S12 described above are repeated until the transmission frequency falls within the third transmission frequency range. Then, the three stages of frequency calibration are passed.

Figure 5:
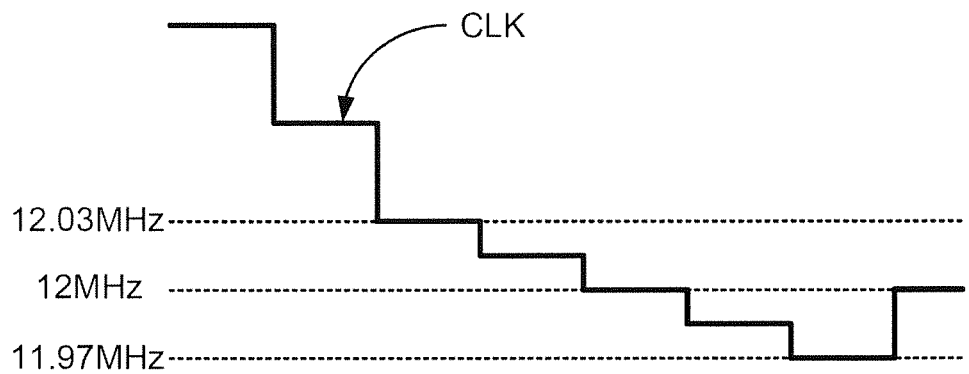
FIG. 5 shows a schematic diagram of the frequencies in the method for calibrating transmission frequency automatically according to the first embodiment of the present invention.
Figure 6:
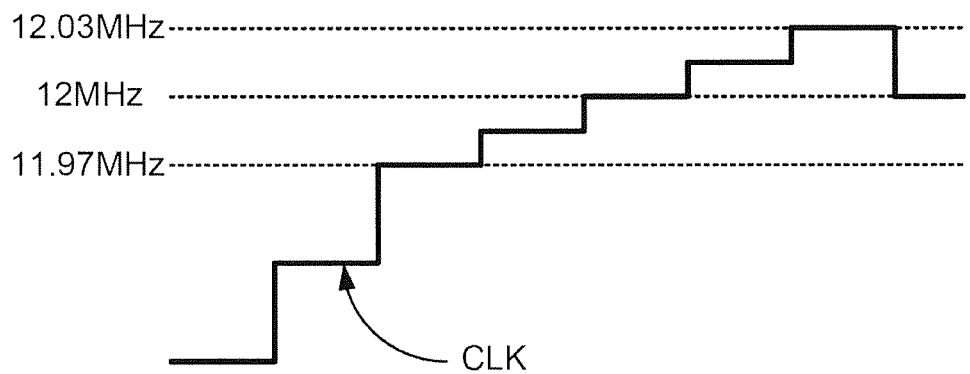
FIG. 6 shows a schematic diagram of the frequencies in the method for calibrating transmission frequency automatically according to the second embodiment of the present invention.
Figure 7:
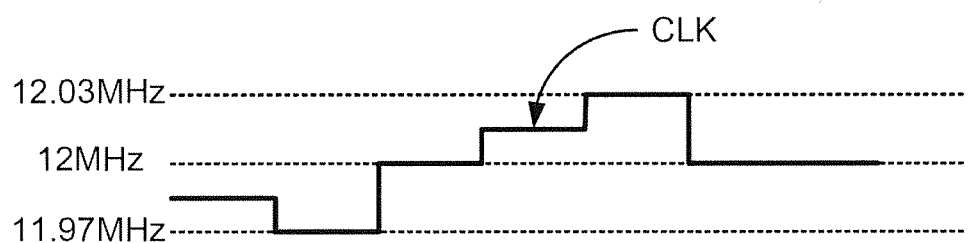
FIG. 7 shows a schematic diagram of the frequencies in the method for calibrating transmission frequency automatically according to the third embodiment of the present invention.

Furthermore, please refer to FIGS. 5 to 7. FIG. 5 shows a schematic diagram of the frequencies in the method for calibrating transmission frequency automatically according to the first embodiment of the present invention; FIG. 6 shows a schematic diagram of the frequencies in the method for calibrating transmission frequency automatically according to the second embodiment of the present invention; and FIG. 7 shows a schematic diagram of the frequencies in the method for calibrating transmission frequency automatically according to the third embodiment of the present invention. In the device identification stage, the device configuration stage, and the data transmission stage described above according to the present invention, the optimum transmission frequency of the operating clock CLK can be further given by using adjusting and calculating methods. Because the adjusting and calculating methods for the three stages described above are identical, only the method for the device identification stage is described here. Besides, the frequency described below is only an example, not used for limiting the range of the present invention.

As shown in FIG. 5, after the device identification stage is started, because the frequency of the operating clock CLK at the initial time is higher than the first transmission frequency range, the data transmission unit 24 or the host 30 generates error handling EH according to the transmission condition of the received plurality of data Data. Then the control unit 26 lowers the transmission frequency of the operating clock CLK and continues the above steps until the transmission frequency of the operating clock CLK falls within the first transmission frequency range. When the data transmission unit 24 or the host 30 stops transmitting the error handling EH, the control unit 26 judges that the frequency at the moment is the upper bound of the first transmission frequency range. Next, the control unit 26 continues to control the transmission frequency of the operating clock CLK to reduce until the transmission frequency of the operating clock CLK is lower than the first transmission frequency range. When the data transmission unit 24 or the host 30 starts to transmit the error handling EH, the control unit 26 judges that the frequency at the moment is the lower bound of the first transmission frequency range. Afterwards, the control unit 26 calculates the central value between the upper bound 12.03 MHz and the lower bound 11.97 MHz of the first transmission frequency range for giving the optimum transmission frequency of 12 MHz and controlling the transmission frequency of the operating clock CLK to 12 MHz.

As shown in FIG. 6, the difference between the present embodiment and the first embodiment is that the frequency of the operating clock CLK at the initial time is lower than the first transmission frequency range. Hence, the control unit 26 raises the transmission frequency of the operating clock CLK until the transmission frequency of the operating clock CLK falls within the first transmission frequency range. When the data transmission unit 24 or the host 30 stops transmitting the error handling EH, the control unit 26 judges that the frequency at the moment is the lower bound of the first transmission frequency range. Next, the control unit 26 continues to control the transmission frequency of the operating clock CLK to increase until the transmission frequency of the operating clock CLK is higher than the first transmission frequency range. When the data transmission unit 24 or the host 30 starts to transmit the error handling EH, the control unit 26 judges that the frequency at the moment is the upper bound of the first transmission frequency range. Afterwards, the control unit 26 calculates the central value between the upper bound 12.03 MHz and the lower bound 11.97 MHz of the first transmission frequency range for giving the optimum transmission frequency of 12 MHz and controlling the transmission frequency of the operating clock CLK to 12 MHz.

According to FIGS. 5 and 6, when the frequency of the operating clock CLK enters the first transmission frequency range, the magnitude of rising or lowering of the operating clock CLK controlled by the control unit 26 is smaller. On the contrary, before entering the first transmission frequency range, the magnitude of rising or lowering of the operating clock CLK controlled by the control unit 26 is larger. Thereby, the first transmission frequency range can be found rapidly outside the first transmission frequency range. On the other hand, within the first transmission frequency range, the upper and lower bounds of the first transmission frequency range can be found with accuracy.

Moreover, when the frequency of the operating clock CLK at the initial time is not in the first transmission frequency range, the present invention can further adjust substantially the frequency of the operating clock CLK higher or lower for making sure whether the operating clock CLK is above or below the first transmission frequency range. If the operating clock CLK is first raised for several times and not finding the first transmission frequency range, it is judged that the frequency of the operating clock CLK is above the first transmission frequency range. For example, according to the first embodiment (FIG. 5), the frequency of the operating clock CLK can be raised for three times. Then it is sure that the frequency of the operating clock CLK is above the first transmission frequency range. Next, as shown in the figure, the frequency of the operating clock CLK is lowered for finding out the first transmission frequency range. On the other hand, according to the second embodiment, because the lower bound of the first transmission frequency ranges is found by first raising the frequency of the operating clock CLK, it is not necessary to lower the frequency of the operating clock CLK.

As shown in FIG. 7, the difference between the present embodiment and the first and second embodiments is that, according to the present embodiment, the frequency of the operating clock CLK at the initial time has been within the first transmission frequency range already. Thereby, all we have to do is to lower the frequency of the operating clock CLK gradually to find the lower bound of the first transmission frequency range and to raise the frequency of the operating clock CLK gradually to find the upper bound of the first transmission frequency range. Then the optimum transmission frequency can be calculated. The order of raising or lower is not limited. Besides, the rest controlling, adjusting, and calculating methods are identical to the first and second embodiments. Hence, the details will not be described again.

In addition, the optimum frequencies for the device identification stage, the device configuration stage, and the data transmission stage can be found according to the adjusting and calculating methods described above. Nonetheless, it is required to have the adjusting and calculating methods described above in each of the stages. It is possible to use the above methods only in the data transmission stage for calibrating the frequency of the operating clock CLK.

To sum up, the present invention discloses a transmission interface device capable of calibrating the transmission frequency automatically and the method thereof. By detecting the transmission condition between the transmission interface device and the host, whether the frequency of the operating clock of the transmission interface device falls within the acceptable frequency range of the host can be determined. If the frequency of the operating clock is not in the frequency range, the host or the transmission interface device generates error handling; the transmission interface device adjusts the frequency of the operating clock according to the error handling gradually until the transmission condition is normal and the host or the transmission interface device stops transmitting error handling. In other words, the host or the transmission interface device cannot detect errors in data reception and the transmission frequency of the transmission interface device is calibrated accurately to the compatible range of the connected host. Besides, no other circuits or quartz oscillator is required. Thereby, the circuit area and cost can be saved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A transmission interface device capable of calibrating transmission frequency automatically, comprising:
   a clock generating unit, configured for generating an operating clock, and said operating clock determining the transmission frequency;
   a data transmission unit, configured for connecting to a host, transmits a plurality of data to said host according to said operating clock or said host transmits said plurality of data to said data transmission unit according to said operating clock; and said host or said data transmission unit generates an error handling when said host or said data transmission unit detects transmission errors in said plurality of data; and a control unit, generating an adjusting signal according to said error handling, and transmits said adjusting signal to said clock generating unit for adjusting said transmission frequency of said operating clock;

wherein transmission communication between said host and said data transmission unit includes a device identification stage, a device configuration stage, and a data transmission stage; and said host has a first transmission frequency range, a second transmission frequency range, and a third transmission frequency range in said device identification stage, said device configuration stage, and said data transmission stage, respectively;

wherein when said host or said data transmission unit is in said device identification stage and detects that said transmission frequency of said plurality of data is beyond said first transmission frequency range, then said host or said data transmission unit generates said error handling; when said host or said data transmission unit is in said device configuration stage and detects that said transmission frequency of said plurality of data is beyond said second transmission frequency range, then said host or said data transmission unit generates said error handling; and when said host or said data transmission unit is in said data transmission stage and detects that said transmission frequency of said plurality of data is beyond said third transmission frequency range, then said host or said data transmission unit generates said error handling.

2. The interface transmission device of claim 1, wherein said third transmission frequency range is smaller than said second transmission frequency range; and said second transmission frequency range is smaller than said first transmission frequency range.

3. The interface transmission device of claim 1, wherein when said transmission frequency is lower than said first transmission frequency range, said second transmission frequency, and said third transmission frequency range, said control unit continues to raise said transmission frequency of said operating clock until said host said data transmission unit do not generate said error handling for finding lower bounds of said first transmission frequency range, said second transmission frequency, and said third transmission frequency range, and continues to raise said transmission frequency until said host or said data transmission unit generates said error handling for finding upper bounds of said first transmission frequency range, said second transmission frequency, and said third transmission frequency range; and said control unit calculates central values of said upper and lower bounds of said first transmission frequency range, said second transmission frequency, and said third transmission frequency range and uses said central values as said transmission frequency of said operating clock.

4. The interface transmission device of claim 1, wherein when said transmission frequency is higher than said first transmission frequency range, said second transmission frequency range, and said third transmission frequency range, said control unit continues to lower said transmission frequency of said operating clock until said host or said data transmission unit do not generate said error handling for finding upper bounds of said first transmission frequency range, said second transmission frequency range, and said third transmission frequency range, and continues to lower said transmission frequency until said host or said data transmission unit generates said error handling for finding lower bounds of said first transmission frequency range, said second transmission frequency range, and said third transmission frequency range; and said control unit calculates central values of said upper and lower bounds of said first transmission frequency range, said second transmission frequency range, and said third transmission frequency range and uses said central values as said transmission frequency of said operating clock.

5. The interface transmission device of claim 1, wherein when said transmission frequency is within said first transmission frequency range, said second transmission frequency range, and said third transmission frequency range, said control unit continues to raise said transmission frequency of said operating clock until said host or said data transmission unit generates said error handling for finding upper bounds of said first transmission frequency range, said second transmission frequency range, and said third transmission frequency range, and continues to lower said transmission frequency until said host or said data transmission unit generates said error handling for finding lower bounds of said first transmission frequency range, said second transmission frequency range, and said third transmission frequency range; and said control unit calculates central values of said upper and lower bounds of said first transmission frequency range, said second transmission frequency range, and said third transmission frequency range and uses said central values as said transmission frequency of said operating clock;

a sleeve that is arranged at a wheel hub while a drive unit passes through the sleeve for driving the wheel hub rotating and further moving the wheel.

6. A method for calibrating transmission frequency automatically, applied to a transmission interface device, and comprising steps of:

generating an operating clock, transmitting a plurality of data to a host or receiving said plurality of data from said host according said operating clock, and said operating clock determining a transmission frequency;

said host or a data transmission unit generating an error handling when said host or said data transmission unit detects transmission errors in said plurality of data; and generating an adjusting signal according to said error handling and adjusting said transmission frequency of said operating clock according to said adjusting signal;

wherein transmission communication between said host or said data transmission unit includes a device identification stage, a device configuration stage, and a data transmission stage; and said host has a first transmission frequency range, a second transmission frequency range, and a third transmission frequency range in said device identification stage, said device configuration stage, and said data transmission stage, respectively;

wherein when said host is in said device identification stage and detects that said transmission frequency of said plurality of data is beyond said first transmission frequency range, then said host generates said error handling; when said host is in said device configuration stage and detects that said transmission frequency of said plurality of data is beyond said second transmission frequency range, then said host generates said error handling; and when said host is in said data transmission stage and detects that said transmission frequency of said plurality of data is beyond said third transmission frequency range, then said host generates said error handling.

7. The method of claim 6, wherein when said data transmission unit is in said device identification stage and detects that said transmission frequency of said plurality of data is beyond said first transmission frequency range, then said data transmission unit generates said error handling; when said data transmission unit is in said device configuration stage and detects that said transmission frequency of said plurality of data is beyond said second transmission frequency range, then said data transmission unit generates said error handling; and when said data transmission unit is in said data transmission stage and detects that said transmission frequency of said plurality of data is beyond said third transmission frequency range, then said data transmission unit generates said error handling.

8. The method of claim 6, wherein said third transmission frequency range is smaller than said second transmission frequency range; and said second transmission frequency range is smaller than said first transmission frequency range.

9. The method of claim 6, wherein when said transmission frequency is lower than said first transmission frequency range, said second transmission frequency range, and said third transmission frequency range, continue to raise said transmission frequency of said operating clock until said host or said data transmission unit do not generate said error handling for finding lower bounds of said first transmission frequency range, said second transmission frequency range, and said third transmission frequency range, and continue to raise said transmission frequency until said host or said data transmission unit generates said error handling for finding upper bounds of said first transmission frequency range, said second transmission frequency range, and said third transmission frequency range; and calculate central values of said upper and lower bounds of said first transmission frequency range, said second transmission frequency range, and said third transmission frequency range and use said central values as said transmission frequency of said operating clock.

10. The method of claim 6, wherein when said transmission frequency is higher than said first transmission frequency range, said second transmission frequency range, and said third transmission frequency range, continue to lower said transmission frequency of said operating clock until said host or said data transmission unit do not generate said error handling for finding upper bounds of said first transmission frequency range, said second transmission frequency range, and said third transmission frequency range, and continue to lower said transmission frequency until said host or said data transmission unit generates said error handling for finding lower bounds of said first transmission frequency range, said second transmission frequency range, and said third transmission frequency range; and calculate central values of said upper and lower bounds of said first transmission frequency range, said second transmission frequency range, and said third transmission frequency range and use said central values as said transmission frequency of said operating clock.

11. The method of claim 6, wherein when said transmission frequency is within said first transmission frequency range, said second transmission frequency range, and said third transmission frequency range, continue to raise said transmission frequency of said operating clock until said host or said data transmission unit generates said error handling for finding upper bounds of said first transmission frequency range, said second transmission frequency range, and said third transmission frequency range, and continue to lower said transmission frequency until said host or said data transmission unit generates said error handling for finding lower bounds of said first transmission frequency range, said second transmission frequency range, and said third transmission frequency range; and calculate central values of said upper and lower bounds of said first transmission frequency range, said second transmission frequency range, and said third transmission frequency range and use said central values as said transmission frequency of said operating clock.

* * * * *